United States Patent [19]

Bruce

[11] 4,011,562
[45] Mar. 8, 1977

[54] SINGLE FREQUENCY RADIO RANGING SYSTEM
[75] Inventor: Robert L. Bruce, San Diego, Calif.
[73] Assignee: Cubic Industrial Corporation, San Diego, Calif.
[22] Filed: Mar. 21, 1975
[21] Appl. No.: 560,339
[52] U.S. Cl. .......................... 343/6.5 R; 343/6.5 LC
[51] Int. Cl.² ............................................. G01S 9/56
[58] Field of Search ............ 343/6.5 R, 6.5 LC, 7.6

[56] References Cited

UNITED STATES PATENTS

| | | | |
|---|---|---|---|
| 2,546,973 | 4/1951 | Chatterjea et al. | 343/7.6 X |
| 2,890,449 | 6/1959 | Pickles | 343/6.5 R |
| 3,742,496 | 6/1973 | Jezo | 343/6.5 R |
| 3,860,921 | 1/1975 | Fletcher | 343/6.5 R |
| 3,900,847 | 8/1975 | Steele | 343/6.5 R |

Primary Examiner—Malcolm F. Hubler
Attorney, Agent, or Firm—Brown & Martin

[57] ABSTRACT

A precision radio ranging system that uses primarily a single carrier frequency interrogating and responding signal that is pulse amplitude modulated to provide phase shift information. A mobile interrogator finds its position by measuring ranges to each of two fixed responders. During a measurement, the interrogator has sole usage of the responder and transmits a pulse of a single frequency RF carrier. The responder measures the received carrier phase and later transmits a reply pulse on the same single frequency RF carrier which replicates this phase. The interrogator determines range to the responder from the phase difference of its own interrogation pulse and the responder reply pulse. In multiple system use, two closely spaced carrier frequencies may be time sequenced to provide multiparty two range service.

16 Claims, 14 Drawing Figures

SINGLE FREQUENCY RADIO RANGING SYSTEM

BACKGROUND OF THE INVENTION

The field of precision electronic distance measurement has long been dominated by microwave type systems. These systems are, however, normally limited to line-of-sight operation. Usually this is not a problem in terrestrial operations, but for offshore uses it is an important limitation. Offshore, over-the-horizon electronic surveying is an application that can be suited to a system employing ground wave propagation. Several ground wave systems are presently used for navigation; these include Loran A, Loran C, Decca, Omega, Consolan and DF. However, none of these systems, except possibly Loran C, is sufficiently accurate for surveying. For the application of surveying, certain specialized systems including Toran, Raydist and Lorac have been developed. These systems are however, susceptible to sky waves and have difficulties with ambiguity resolution. In addition, their accuracy has been relatively insufficient for certain applications, notably offshore petroleum surveying. Further such systems often require a rather large frequency bandwidth that is often unavailable, and the systems lack flexibility in changing the signal frequency for operation, that is often required in use of the systems. Such systems do not normally permit a "narrow band" operation of two closely spaced frequencies, and thus often require a pre-fixed frequency band for operation that is not available in the particular locality in which the system is to be used.

It is thus advantageous to have a new and improved offshore, over-the-horizon, electronic surveying and ranging system.

SUMMARY OF THE INVENTION

In preferred embodiments of the invention, simplified and complex embodiments of the invention are illustrated. In each embodiment, the ranging system provides a mobile interrogator that interrogates a plurality of fixed responders to find its position by measuring ranges to each of two fixed responders having known locations. During such measurements, the interrogator has sole usage of the responder and transmits an amplitude modulated pulse of RF carrier. The responder measures the received carrier phase of the pulse and later transmits a reply pulse which replicates this carrier frequency and phase. The interrogator then determinates the range to the responder from the phase difference of its own interrogation pulse and the responders reply pulse.

Thus the interrogator and responders operate on the same carrier frequency, and their transmissions are time multiplexed. The interrogator initiates the ranging cycle by transmitting at the carrier frequency the interrogation pulse during a given time period. The responder receives this signal, and providing that the signal remains above a given threshold value, replies with a carrier transmission that is delayed in time from the end of the interrogator signal, but is phase coherent. The round trip distance is then determined from the round trip phase delay of the single frequency carrier signal in the amplitude modulated pulse. By causing the responder to transmit the same phase it receives from the interrogator, the round trip phase delay becomes available at the interrogator. It is then necessary for the interrogator to compare its transmitted phase to the phase received from the responder to measure the phase delay.

In the responder, the phase repeating is implemented by having the receiver sample the transmitted signal to detect any difference of responder transmitted phase from responder received phase. This sampling is done with a directional coupler and calibrated attenuator. The attenuator in one embodiment is adjusted so that the receiver is presented with substantially equal amplitudes of received and transmitted signals. In the second embodiment, the amplication of the receiver is controlled to achieve relatively equal amplitudes. This requires that the receiver phase delay be substantially independent of its amplification. Any phase difference between the received and transmitted signals is nulled by controlling the phase of the carrier of the signal transmitted by the responder.

More specifically the phase of the carrier of the pulse received by the responder is measured against that of a high stability local oscillator standard in the responder that has a frequency substantially that of the carrier. After reception and measurement of the interrogator pulse, the responder then transmits a reply pulse to the interrogator. This reply pulse has its RF carrier phase shifted so as to replicate the previously received phase. The necessary phase shift in the responder to the internally synthesized carrier signal is provided by the sum of a stored phase offset constant and the measured phase of the received signal. The additive phase offset constant accounts for certain internal phase delays. By comparing the phase of the responder transmitted signal with the phase of the responder received signal in a phase meter in the responder, it can be determined if the proper signal was transmitted. If these phases are different, the phase offset constant is updated so as to provide the correct phase in future transmissions.

In making distance measurements between the interrogator and fixed responder locations, the particular wave length of the carrier frequency is such that many cycles of the carrier, or lanes occur in the round trip path. Thus in the system the pre-determined position of the ship, vehicle, or the like carrying the interrogator is determined and recorded as an initial position, and changes in lanes and phase shift between lanes is updated to provide the location and ranging distance between the interrogator and the respective responders.

In the system, access to the responders is timed shared among the interrogators in a defined order such that every interrogator may periodically collect range data points. This requires accurate timing that must be established throughout the system, and is accomplished in one embodiment by designating one of the responders as the master responder and using it as a timing reference. It communicates timing to the system by periodically transmitting a distinguishable, elongated timing pulse. This pulse is about twice the length of the ordinary interrogation or reply pulse, and occupies a time interval designated for timing and not used for interrogation or reply.

It is therefore an object of the invention to provide a new and improved single frequency radio ranging system.

It is another object of the invention to provide a new and improved radio ranging system that provides narrow band operation on one or two closely spaced frequencies, with time sequenced multiparty range-range service and great flexibility in signalling formal and system operation.

Other objects and many advantages of this invention will become more apparent upon a reading of the following detailed description and an examination of the drawings, wherein like reference numerals designate like parts throughout and in which:

Figure 1:
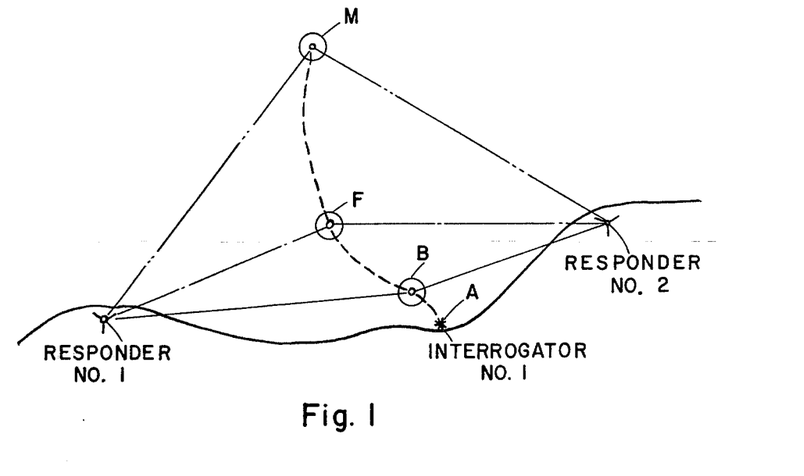
FIG. 1 is a diagram illustrating the relative positions of responders and interrogators and relative movement therebetween in making range measurements.
Figure 2:
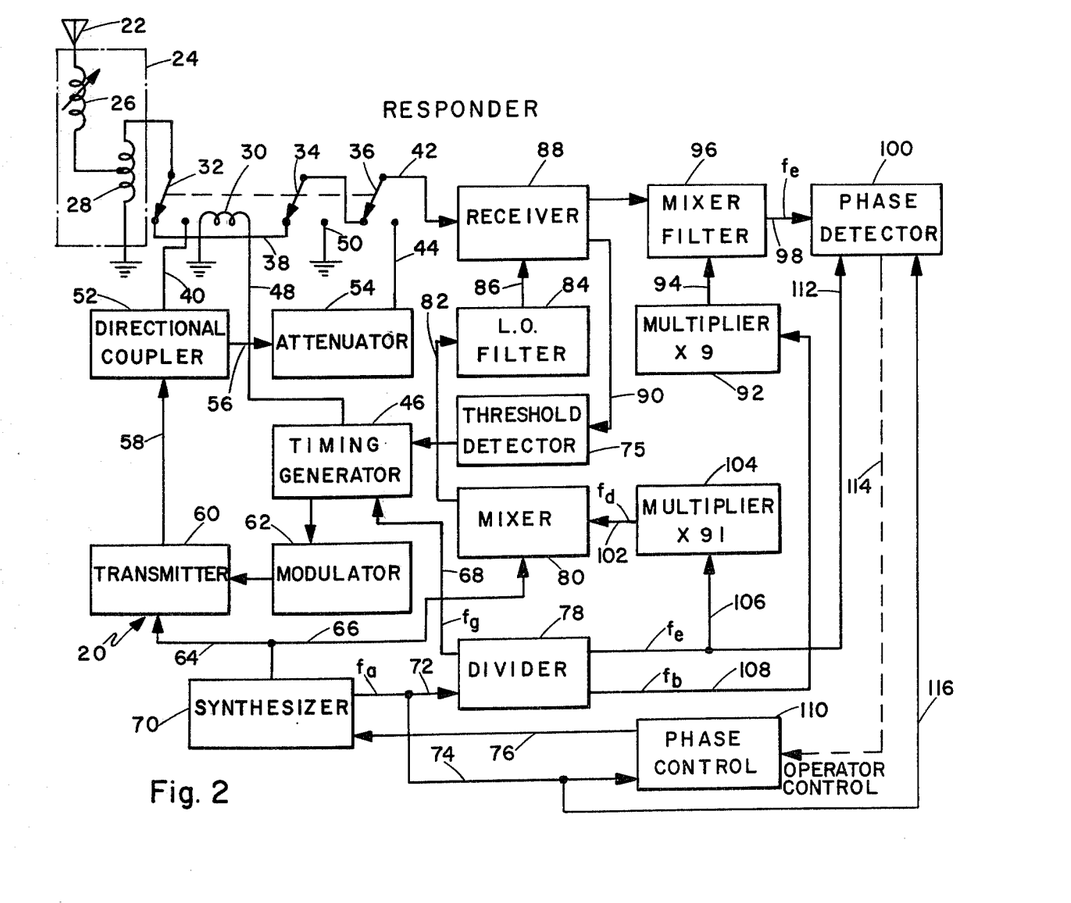
FIG. 2 is a block circuit diagram of the responder.
Figure 3:
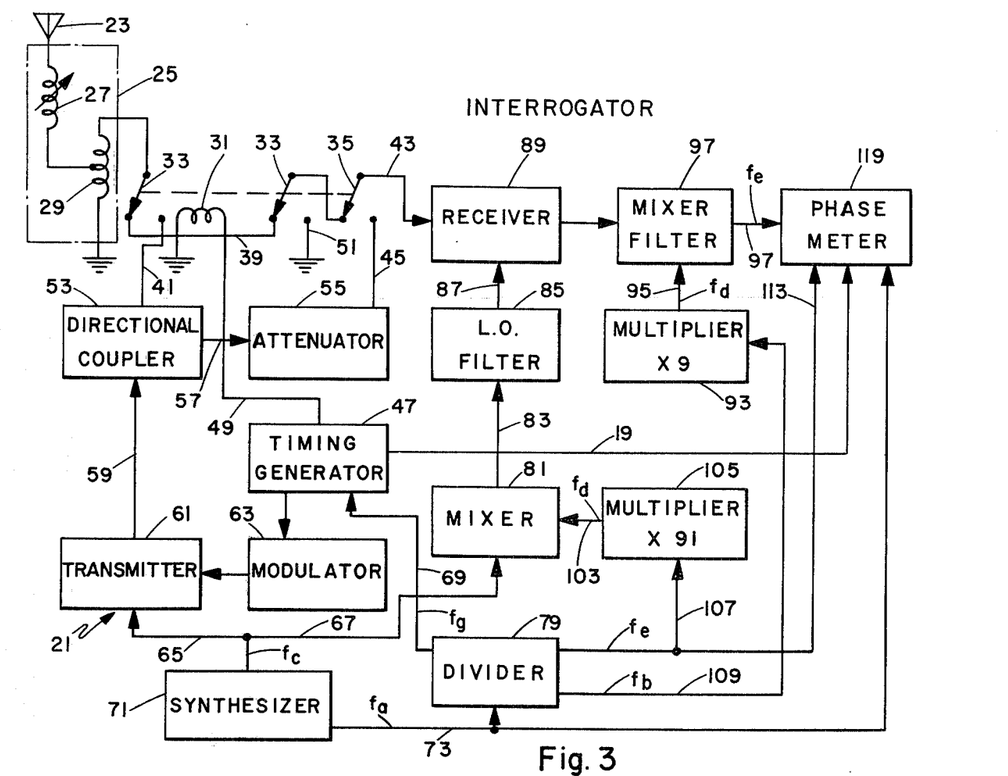
FIG. 3 is a block circuit diagram of the interrogator.

Referring now to the drawings and specifically to FIGS. 1, 2 and 3, the single frequency ranging system has interrogator units and responder units. Normally the responder units are at fixed and identified positions such as on land, or at fixed positions at sea. The interrogator units are mounted on boats, ships or the like that move, for example, on water relative to the responders. Each interrogator sends out a measuring carrier frequency that is received by respective ones of the responders. Each responder sends back a single frequency responsive carrier signal to the interrogator. This return signal is at the same carrier frequency of the transmitted interrogator signal. The interrogator then transmits a signal to another responder, and also receives a return signal. The distance determination, in a manner that will be described in more detail hereinafter, between an interrogator and two responders is then used in the known manner to establish the location of the interrogator or moving ship. Interrogation of the respective responders by a given interrogator is accomplished in a suitable manner, such as by multiplexing or the like.

In the system the phase difference of the transmitted and received carrier frequency is used to determine the distance between a given responder and interrogator. Since of necessity the frequency of the signal is such that the wavelength is relatively short, it is also necessary to keep track of the number of half wavelength displacements or "lanes" between respective responders and the interrogator. Thus for example, referring to FIG. 1, an interrogator No. 1 might be the ship or the like that is to communicate with respective responders, Nos. 1, 2 and 3. Initially interrogator No. 1 establishes its position at location A in "lanes" relative to the responders. This is established by pre-measurement. Interrogator No. 1 then proceeds on the course generally illustrated, taking readings from respective responders, each on a complete transmit and receive cycle of about 320 microseconds. During this period of time interrogator No. 1 transmits and receives from a responder's single frequency carrier of which the phase shift is determined. In the system, when the range has increased by a "lane" or half of a wavelength of the transmitted signal, then the display recording mechanism at the interrogator numerically records the new "lane", thus correlating and establishing the positions of the interrogator No. 1 relative to the respective responders No. 1 and 2. Interrogator No. 1 can also send a signal to a responder to time synchronize the system in a manner that will be described in more detail hereinafter.

Figure 5:
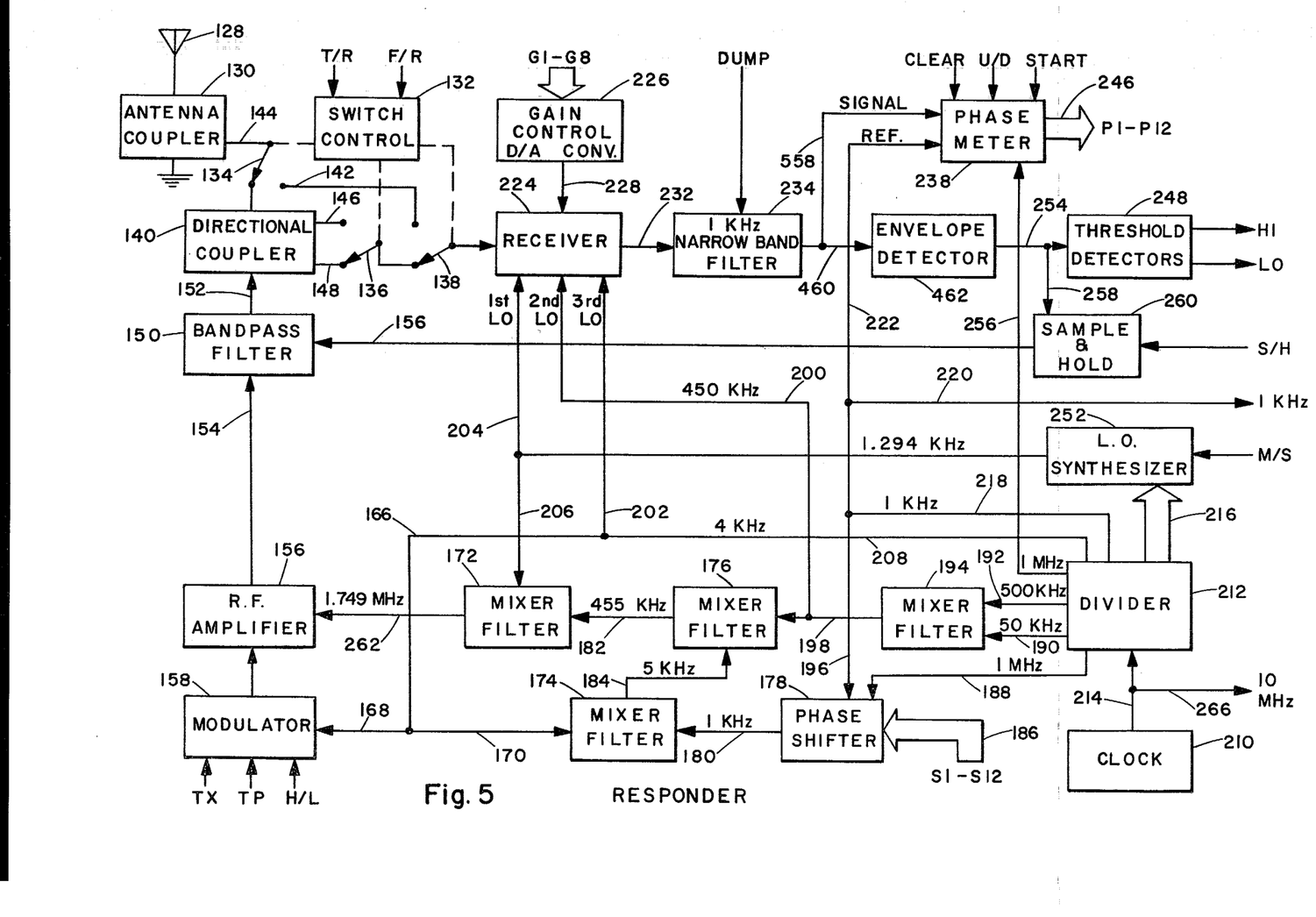
FIG. 5 is a block diagram of a second embodiment of the responder.
Figure 6:
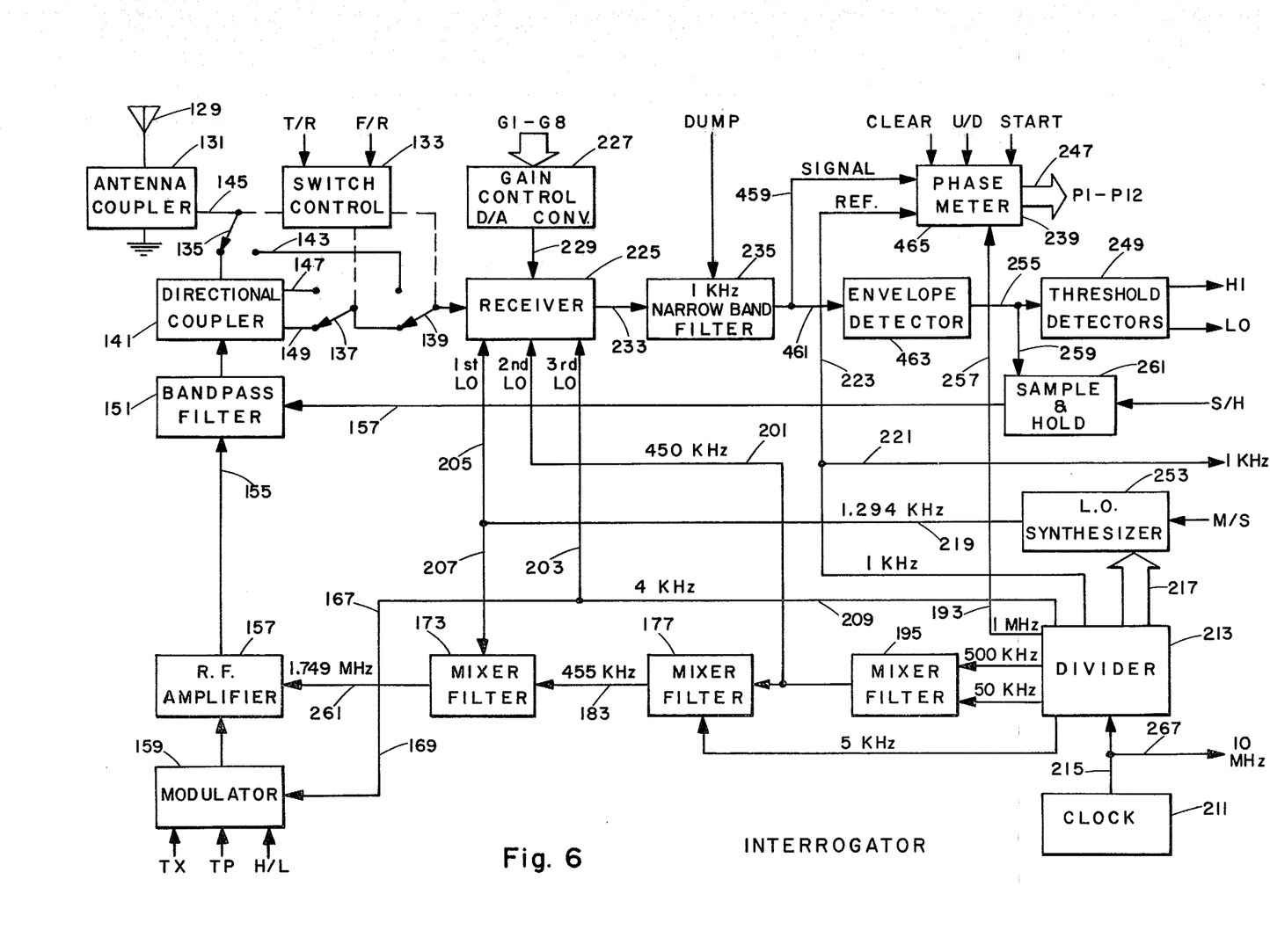
FIG. 6 is a block circuit diagram of a second embodiment of the interrogator, that operates with the responder of FIG. 5.
Figure 7:
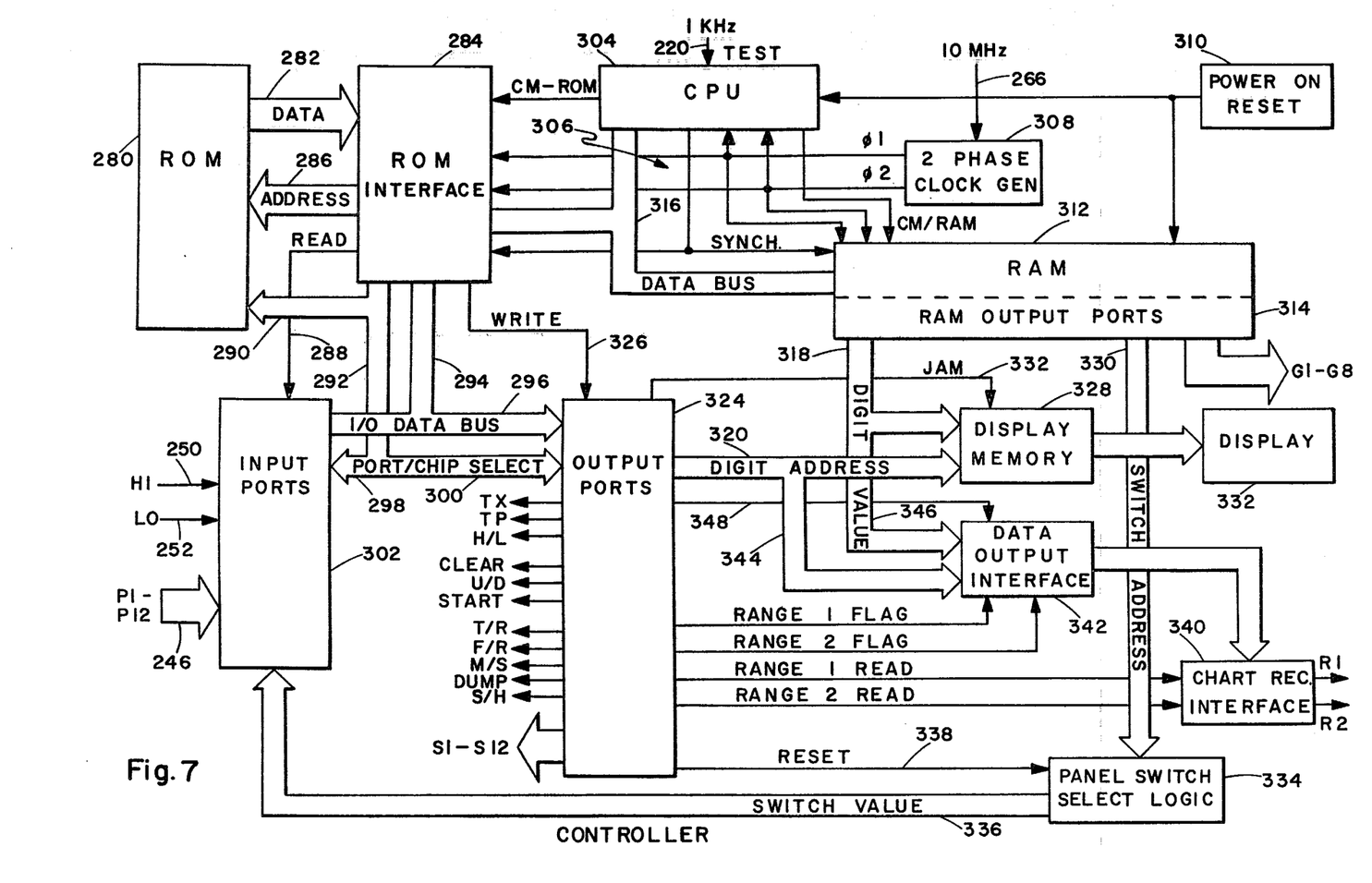
FIG. 7 is a block circuit diagram of the controller, that is used with each of the responders and interrogators illustrated in FIGS. 5 and 6.

There are disclosed two systems, with the first system generally illustrated in FIGS. 2 and 3 being a more simplified embodiment and the system illustrated in FIGS. 5, 6 and 7 being a more complete and complex form of the preferred embodiments.

Referring to FIGS. 2 and 3, FIG. 3 illustrates the interrogator 21 that sends the carrier frequency signal to the responder 20 illustrated in FIG. 2. The responder 20 then transmits the carrier frequency signal back to the interrogator 21 of FIG. 3. Since many of the operations of both circuits are the same, it may be noted that many of the same components exist in each of the responder 20 and interrogator 21 circuits. For purposes of explanation, the interrogator circuit 21 of FIG. 3 will be described first and the differences from the responder circuit 20 relative to the interrogator circuit 21 will then be described.

Referring now to FIG. 3, the synthesizer 71 is a precision oscillator that provides a precision clock signal $fa$ in line 73 to the divider circuit 79 and to the phase detector 119; and a precision output carrier signal $fc$ through line 65 to the transmitter 61 and through line 67 to the mixer 81. For purposes of descriptive illustration of this embodiment, the clock frequency $fa$ is 1 MHz and the carrier frequency $fc$ is 1.6 to 2.0 MHz. The carrier frequency is an established frequency that can generally be within the range set forth. One of the advantages of this ranging system is that the carrier frequency $fc$ can be quickly changed to another carrier frequency within a given range of frequencies, without requiring any change in the circuit components. This frequency change can be made in the synthesizer 70 in the known manner.

The carrier frequency $fc$ that is fed to the transmitter 61 is not modulated. The carrier frequency $fc$ is amplitude modulated by a signal from modulator 63. This provides an output amplitude modulated carrier frequency signal that, for purposes of illustration in this embodiment, has a trapezoidal envelope 120 (see FIG. 4). This interrogating pulse amplitude that is modulated onto the carrier frequency can have another shape, which will be described in more detail hereinafter.

The modulated interrogator transmission pulse 120 is then fed through line 59 to the directional coupler 53 and through line 41, switch contact 33 and matching network 25 to the transmitting antenna 23. Divider 79 feeds a time signal fg of 1 KHz to the timing generator 47. Timing generator 47 then feeds a pulse through line 49 to switch 31, operating switch 31 to switch respective contacts 33, 35 and 37 to the opposite positions. In the positions illustrated, the interrogator is set to receive. In the switched condition, switch 31 is set to transmit. Switch 31 may be any suitable high speed switch and can be, for example, several coaxial RF reed switches. These switches are driven in tandem from the control line and can accomplish a change from transmit to receive in less then 5 milliseconds.

Referring now to FIG. 2, the responder's antenna 22 receives the transmitted amplitude modulated carrier frequency from the interrogator and feeds this signal through the matching network 24 and to contact 32 of the switch 30. A loading coil 26 in the antenna matching network 24 is set relative to transformer 28 to provide proper adjustment of the antenna circuit to provide a desired zero standing wave ratio in the directional coupler 52.

The input signal is fed through line 38, switch contact 34, switch contact 36 and line 42 to the receiver 88. The receiver 88, used in the interrogator and responder, is of the superhetrodyne type, and has an input band pass filter and an RF amplifier that feeds the input filtered carrier frequency signal to a mixer. The mixer receives a local oscillator signal of 1.145 to 1.545 MHz from mixer 80, line 82, L. O. filter 84 and line 86. This provides an intermediate frequency of 455 KHz. The IF band which is about 2 KHz is set by a mechanical filter. The output of the receiver is mixed in mixer filter 96 with a 450 KHz signal providing the phase shift information in a 5 KHz signal fe in line 98 to the phase detector 100.

The synthesizer 70 has a precision VCO oscillator and provides a 1 MHz clock signal 72 to the divider 78. The divider 78 supplies an fe, 5 KHz signal through line 106 to the multiplier 104 that in turn feeds a 455 KHz frequency fd through line 102 to the mixer 80. This signal is mixed with the transmitter carrier frequency fc that supplies the signal to the L. O. filter 84. The L. O. filter 84 has a reject filter at the carrier frequency fc to remove residual carrier from the L. O. signal. The 450 KHz signal received through multiplier 92 is in turn based upon a 50 KHz signal frequency fb supplied through line 108 from from divider 78. The divider 78 also provides the 5 KHz signal fe through line 112 to the phase detector 100.

The synthesizer 70 is a known synthesizer circuit that can provide a selectable carrier frequency up to 2 MHz deprived from an internal 1 MHz clock. The phase control 110 is a precision, externally controlled potentiometer that controls the phase of the precision, crystal VCO oscillator in the synthesizer 70 in response to the 1 MHz clock signal and an operator control or phase detector control 114. For example, the precision potentiometer may be selectively adjusted to adjust the VCO voltage in line 76 to change the phase of the carrier frequency fc supplied by synthesizer 70 to the transmitter 60.

When the threshhold detector 75 detects a signal in line 90 above the given threshhold, thus reflecting that an amplitude modulated signal has been received by the receiver 88, then the timing generator 46, after the appropriate time interval, provides a switching pulse to switch 30. This moves the respective contacts 32, 34, 36 to connect to lines 40, 50 and 44. The transmitter 60 output signal from the responder 20 is then fed through lines 58, through the directional coupler 52, through line 40 and switch contact 32 to the transmitting antenna 22. At the same time, the directional coupler 52 samples the transmitter output and feeds a small amount of the signal extracted through line 56 to the attenuator 54 and through line 44, switch contact 36 and line 42 to the receiver 88. The attenuator 54 is a standard circuit that may be adjusted to bring the signal strength of the extracted transmitted signal down to the level of the signal received by antenna 22. It is important that the two signals received by the receiver 88 through switch contact 36 have amplitudes close in magnitude in order to reduce possible amplitude related phase shifts that can occur in the receiver 88. The receiver 88 is well shielded to avoid stray pickup and also is designed to have a low amplifying-phase shift ratio. In this separate time frame operation, the receiver 88 now processes the carrier frequency transmitted from the transmitter 0 as amplitude modulated by the modulator 62, through the mixer filter 96 and through line 98 to the phase detector 100. Phase detector 100 thus displays the phase shift difference between the responder received interrogator signal and the responder transmitted signal that reflects the internal time delays of the responder circuit 20. It will be understood that the phase shift due to internal delays between switch contact 36 and the phase detector 100 are the same for both the transmitted and received signals. Thus the phase shift due to internal delays, corresponds to that resulting from time delays through operator control 114, phase control 110, synthesizer circuit 70, and the transmitting circuit 60.

To remove the internal phase shifting delay, the phase shift control 110 provides a VCO voltage through line 76 to the synthesizer 70 to change the phase of the synthesized output carrier frequency fc. This phase shift control is projected to be that which makes the output transmitted frequency fc from transmitter 60, phase coherent with the interrogator signal received in line 38 of the responder 20.

Figure 4:
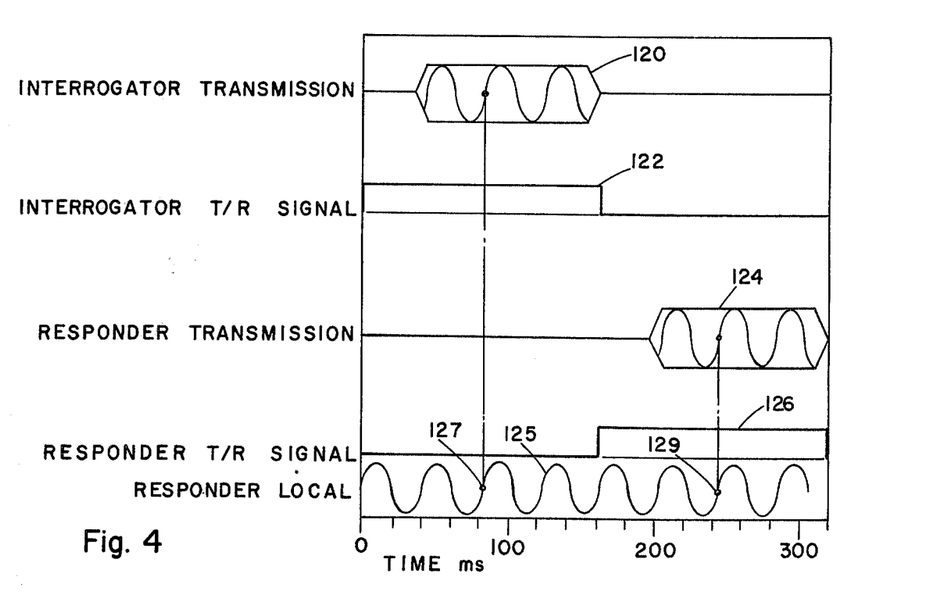
FIG. 4 is a diagram illustrating the relative timing of interrogator and responder transmissions and the phase relationship therebetween relative to the single frequency carrier.

As illustrated in FIG. 4, the interrogator T/R signal is that signal fed by the timing circuit 47 through line 49 of the interrogator 21 and the responder T/R signal is that timing signal fed through line 48 to switch 30 in the responder 20. Each of these respective signals have a time length envelope 122 and 126, that is greater than the envelope length of the interrogator transmission 120 and responder transmission 124. However, the purpose of the responder signal is to provide a responder transmission at the same carrier frequency as the interrogator transmission carrier frequency, which responder transmission has the same phase shift as responder received interrogator transmission signal. Thus reference lines 127 and 129 identify the phase relation of transmission and reception to the intermediate frequency 125, and illustrates the achievement of the desired phase of the responder transmission.

In order to synthesize a phase coherent transmitted signal from the responder 20, it is necessary to recognize the following phases. P is the phase of the received interrogator signal, C is the phase shift due to internal time delays within the responser, and −X is phase offset constant established by the phase control 110. It may be understood that at the responder 20, transmitted carrier frequency will have the same phase as the responder received interrogator carrier frequency, and thus the phase shift delays in the responder circuit are eliminated when:

$$P + C + -X - P = 0$$

Figure 8:
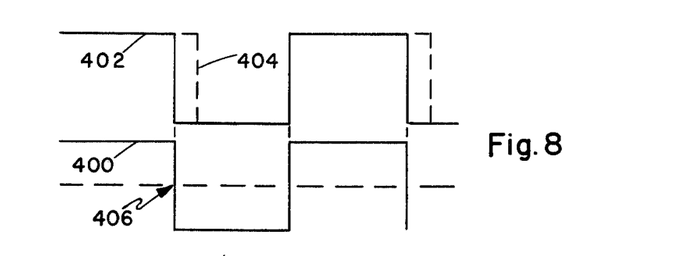
FIG. 8 is a diagram of phase comparisons made in the phase detector of the responder of FIG. 2.

Thus a given predicted phase shift of −X is set by the phase control 110 to control the phase of the output carrier signal through synthesizer 70 at line 40. Through the operation of switch 30, this output signal is compared with the received signals from the interrogator, and both signals may, for example, be displayed on the face of an oscilloscope. The two phases of their respective signals in the phase detector 100 are illustrated in FIG. 8. Waveform 400 corresponds to the interrogator signal received by antenna 22 and signal 402 corresponds to the transmitted signal received through the attenuator 54. The dotted line signal 404 corresponds to that carrier frequency signal fed from the directional coupler 52 of the responder to the attenuator 54 before the phase control 110 was reset to establish an adjusted VCO voltage so that the signals 402 and 400 have the same phase at point 406.

It may be understood that the display in the phase detector 100 may be observed by an operator and the VCO output of the phase control 110 may be selectively set by the operator, or the phase shift between the respective signals in phase detector 100 may be detected and through a known feedback control be employed to adjust the VCO voltage of the phase control 110 to establish time correlation between the two signals and thus elimination of the internal phase shift delay.

Figure 12:
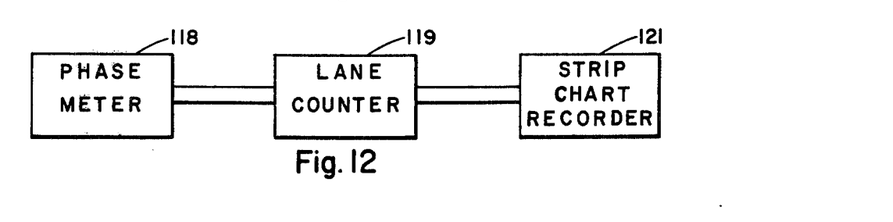
FIG. 12 is a block schematic diagram of lane counter equipments used with the interrogator phase meter of the system of FIG. 3.

The responder 20 thus transmits a return carrier frequency signal to the interrogator 21, which interrogator is now set to receive the signal as illustrated in FIG. 3 through operation of the timing generator 47 of the interrogator. The received responder signal is fed through the receiver 89 and mixer filter 97 into the phase detector 119. This signal in the phase detector 119 is compared with the transmitted and amplitude modulated signal of the transmitter 61 of the interrogator 21 in the manner previously described relative to the responder, to provide a phase comparison of the phase shift of the signal resulting from the time of transmission to the responder 20 and from the responder 20 back to the interrogator 21. The phase detector circuit preferably comprises a gated counter type phase detector with a 1 MHz clock signal, so that the phase measurement is made at a signal frequency below the receiver IF. A frequency of 5 KHz is used because of ease of generation and of the resolution of 200 clock pulses per cycle. In its simplest form, the counter is permitted to count clock pulses in the interval between positive going zero axis crossings of the reference and signal sign waves, with the number of pulses counted being a proportional indication of the phase lag of the signal received to the reference. A more preferred approach is making a phase difference measurement that is the received phase minus the transmitted phase. This is obtained by using an up down counter and counting down during transmissions. It may be understood that the phase detector, each time it provides a reading through a zero cross-over, reflects an additional "lane" being crossed by the interrogator. Thus a suitable zero crossing detector feeds a "lane" counter 119 that counts each "lane" being crossed between the respective interrogator 21 and the responders, and feeds this information to an appropriate strip chart recorder 121, see FIG. 12.

In the modified embodiment illustrated in FIGS. 5, 6, and 7, there is provided a precision radio ranging system that operates, for example, in the 1.7 MHz band and provides an accurate positioning sensing for offshore over-the-horizon applications. It has a narrow band operation that can operate on one or more closely spaced frequencies that are time sequenced multiparty range-range service, and has micro processor control of signalling and processing functions. The signalling system allows a mobile interrogator to find its position by measuring ranges to each of two fixed responders. During a range measurement, the interrogator has the sole usage of the responder and transmits a pulse of RF carrier. The responder measures the received carrier phase and later transmits a reply pulse which indicates this phase. The interrogator determines range to the responder from the phase difference of its own interrogation pulse and the responder's reply pulse.

Access to the responders is time - shared among the interrogators in a defined order so that each interrogator may periodically collect range date points. Accurate system timing is accomplished by designating one of the responders as the master responder and using it as a timing reference. This master responder communicates time to the system by periodically transmitting a distinguishable timing pulse. In the present configuration, eight interrogators can measure two ranges every two seconds using a single frequency.

In this embodiment, there are similarities between the interrogator and the responder such as existed in the earlier described embodiment. However, in this embodiment a controller is used for each of the interrogators and responders, to control their respective operations in a pre-programmed arrangement.

Figure 9:
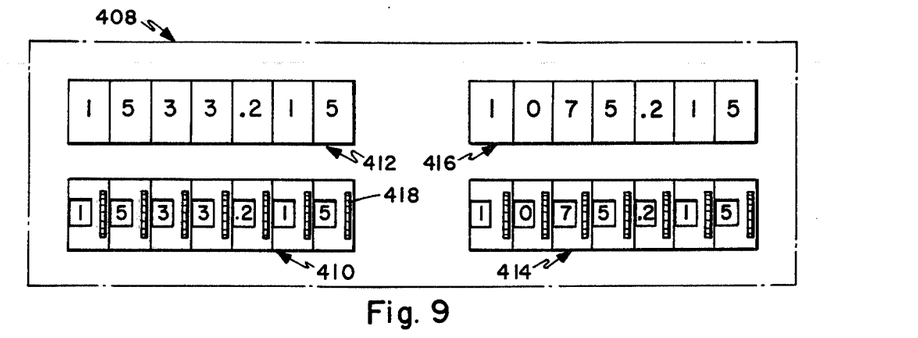
FIG. 9 is an illustration of the switches and displays in the panel switch select logic of the controller of FIG. 7.

Referring to the controller of FIG. 7, a controlled processor unit 304 provides coordinated process signals that process control signals to the random access memory 314 (RAM) to addressed control processes, as previously entered into the read-only memory 280, (ROM). In initial operation, the system is controlled by a panel switch select logic 334. As previously described in FIG. 1, to determine locations of a ship carried interrogator No. 1, it is necessary to first determine the location of point A relative to the responders Nos. 1 and 2. In the ranging system, the location of A is known. Thus at point A in initiating the system, the particular location of the interrogator No. 1 is set by dial control indicators 410 (see FIG. 9) on the face panel of the panel switch select logic 334. A operating button is then pushed on panel switch select logic 334 that places the appropriate digital information reflecting the range location of 1533.215 into the input ports 302 through switch value lines 336. The CPU 304 operates on a 1 KHz clock signal through line 220 and interrogates the input ports 302 every two seconds, and detects that there is information from the logic 334. The CPU 304 then transfers the switch value data from the input pots 302 through data bus 296 and 294, through ROM interface 284, and through data bus 316 to the CPU 304. CPU 304 then inserts the information one digit at a time from the CPU to the appropriate RAM 312 cell, as designated by the addresses in the ROM 280. When all the digits are in the RAM cells of RAM 312, then this information is fed through the RAM output ports 314 under control of the central processor unit 304, through lines 330 to the panel switch select logic 334, where the appropriated digits appear in the display 412. The location of a second responder is also located in the settings of panel switch 414, and in the previously described manner this information is entered into the cells of the RAM 312 and thus displayed in panel display 416 in the manner previously described.

The ranging system is operated under control of the controller in a routine that is set up on the control panel switch select logic 334, in accordance with preset address control steps of the ROM 280. In initial operation, the responder (see FIG. 5) transmits an RF signal generated in RF amplifier 156 through line 154 and through band pass filter 150, through line 152, directional coupler 140, through switch contact 134, line 144 and antenna coupler 130 to the antenna 128. A precision clock 210, that may comprise a precision crystal controlled oscillator, feeds a clock signal of, for example, for this embodiment, 10 MHz through line 214 to the divider 212. The divider 212 respectively divides the input clock signal into a 1 MHz signal in line 256, a 500 KHz signal in line 192 to the mixer filter 94, a 50 KHz signal through line 190 to the mixer filter 194 and a 1 MHz signal through line 188 to the phase shifter 178. The divider 212 also feeds a 4 KHz signal through line 166 and line 168 to the modulator 158 and through line 170 to the mixer filter 174. The mixer filter 194 mixes the input frequency signals of 500 KHz and 50 KHz and feeds the difference frequency of 450 KHz through line 200 as the second local oscillator signal to the receiver 224, and through line 198 to the mixer filter 176. Mixer filter 174 mixes a 1 KHz signal received from line 180 and the 4 KHz signal received from line 170 to provide a 5 KHz signal through line 184 to the mixer filter 176. Mixer filter 176 then combines the 450 KHz input signal from line 198 and the 5 KHz signal from line 184 to provide a 455 KHz signal in line 182 to the mixer filter 172. Mixer filter 172 combines the input of 1.294 KHz from the L. O. synthesizer 252 to provide a signal of 1.749 MHz to the RF amplifier 156, which provides the carrier frequency to the RF amplifier.

It may be understood that the L. O. synthesizer 252 provides the carrier frequency of the transmitted frequency of the responder, and the phase shifter 178 in response to data signals from the controller through lines 186 provides the phase shift to the carrier frequency through the mixer filter 172. The modulator 158 provides a controlled modulated amplitude pulse to the carrier frequency signal output of the RF amplifier 156.

Referring now to FIG. 6 and the interrogator, the interrogator employs a circuit having similar components to that of the responder, wherein the clock circuit 211 provides a stable frequency output that is fed through lines 215 to the divider 213, which provides a frequency signal to the L. O. synthesizer 253 that provides an output frequency signal of 1.294 KHz in line 210 to the mixer filter 173 that mixes that signal with a 455 KHz signal received through line 183 of the mixer filter 177 to provide a carrier frequency of 1.749 MHz in line 261. This carrier frequency is modulated by a modulator 159 that is synchronized by a 4 KHz signal received through line 169.

Figure 10:
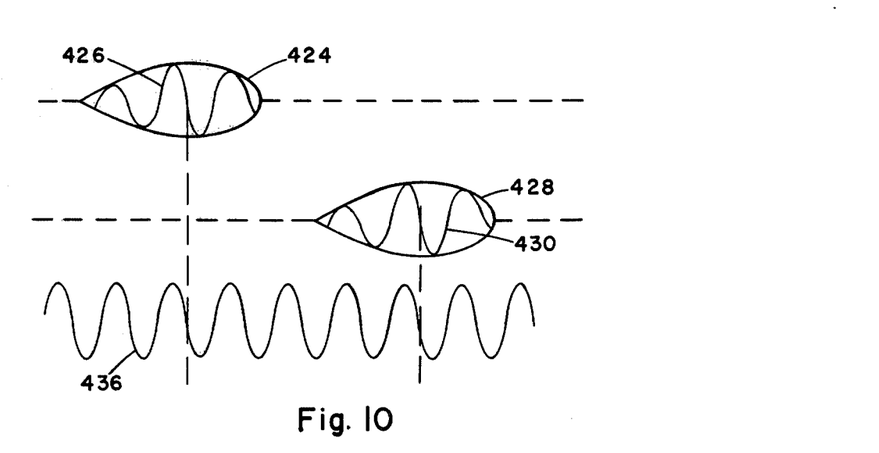
FIG. 10 is a diagram illustrating the pulse shape of the amplitude modulated carrier pulses transmitted and received by the responder and interrogator of FIGS. 5 and 6, with the phase relationship relative to the synthesized carrier frequency of the responder of FIG. 5.
Figure 11:
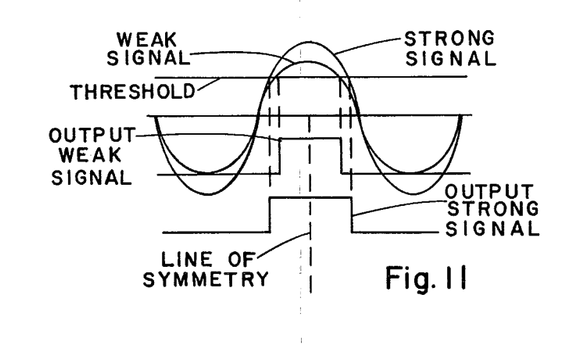
FIG. 11 is a schematic diagram illustrating the symmetry of the slotted frequency determination of the range signal in the processors.

In transmitting and receiving the pulse shaped amplitude signals on the carrier frequency, the effect of interference with other signals can create range measurement errors whose magnitude depends upon the severity of the interference. It has been found that a pulse shape having a general egg shape such as illustrated in FIG. 10, provides a minimum of interference in the system. This pulse shape is generated in the modulator 159 and RF amplifier 157 of the interrogator and in the RF amplifier 155 and modulator 158 of the responder circuit. The pulse shape is determined by internal programmed information in the modulator, and has means for extending the length of the pulse for use in timing the system in a manner that will be described hereinafter.

Figure 13:
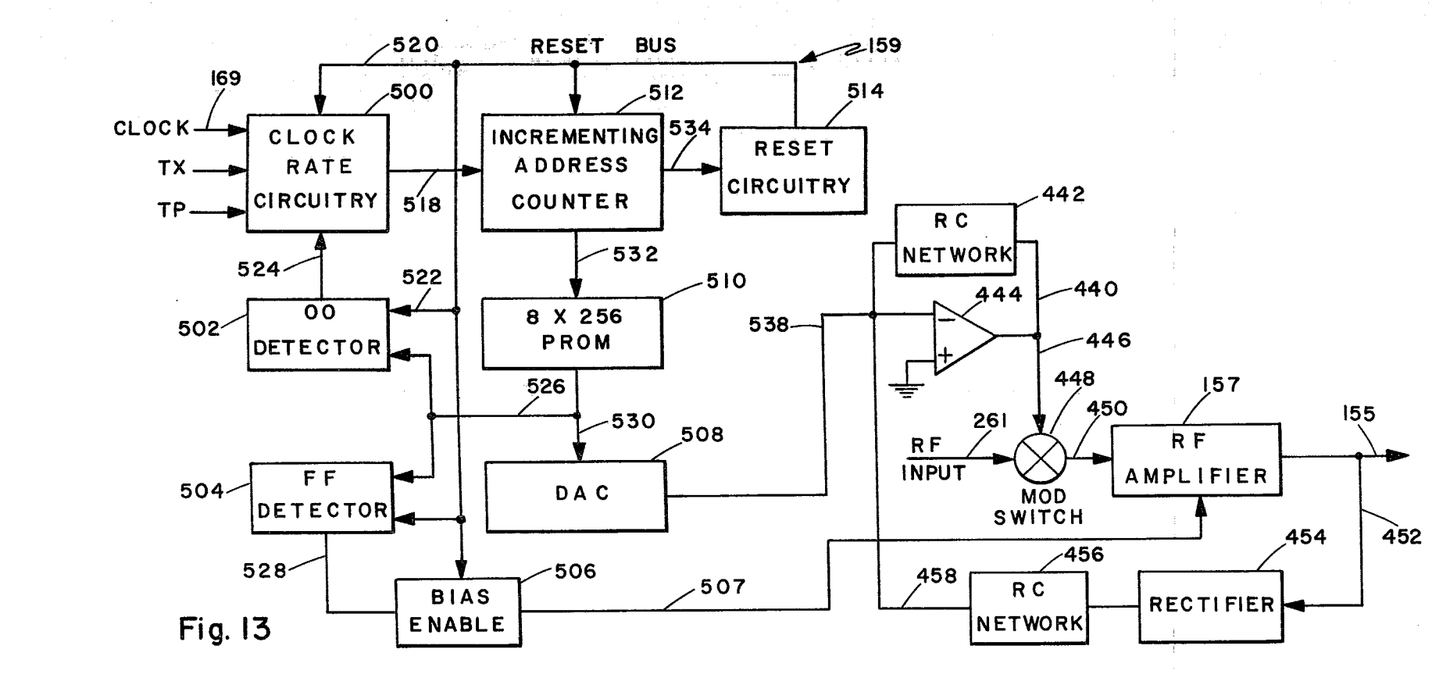
FIG. 13 is a block and schematic diagram of a transmitter modulator for amplitude modulating a carrier frequency to provide a digitally controlled output waveform.

Referring to FIG. 13, the modulator generates, on command, an amplitude pulse of a specified length and shape that is used to modulate the RF carrier. The modulator has a programmable read-only memory 510, hereinafter referred to as PROM, in which the desired pulse shape or modulation envelope digital data is stored as bit weights at specific address locations. On command, the PROM 510 is caused to output the data stored to a digital to analog converter 508 (DAC), that converts the weighted data to an analog waveform that is fed to the RF amplifier 157 as a modulation envelope. An incrementing address counter 512 provides eight bit parallel binary addressing to the PROM at a specified clock rate, which is set by the clock rate circuitry 500.

In operation, the clock rate circuitry 500, upon recognizing a modulation enable command in line $T_x$, outputs a frequency $f$ to the address counter 512 that begins to increment sequentially through the 256 address locations of the PROM 510. As each address location is recognized, contents of the particular ROM cell at the location provides an output to the DAC which converts the output to an analog level. If no command except modulation enable is detected by the clock rate circuitry 500, the PROM 510 will continue to output all information stored in memory through address FF (256). As address FF is initiated by the address counter 512, a signal is fed through line 534 to the reset circuitry 514 which activates the reset circuit that resets the incrementing address counter 512, the clock rate circuitry 500, the 00 detector 502, the FF detector 504, and the bias enable 506. This returns the modulator 159 to a steady state to receive another modulation enable command.

The output of the DAC 508 is fed through line 538 to the operational amplifier 444. The operational amplifier 444 feeds the output of the amplifier through line 446 to the modulator switch 448, that amplitude modulates the RF input signal in line 261 from the mixer filter 173, and feeds this signal through RF amplifier 157 to the output line 155. The operational amplifier 444 employs negative feedback to input line 538, through the feedback circuit line 440 and feedback network 442 which filters out the individual step integrations. Line 452, rectifier 454, network 456 and line 458 provide a feedback signal from the output line 155 to the input line 538 of the operational amplifier 444, that provides for correction of amplitude, phase and frequency distortion on the modulation envelope caused by the RF amplifier. In accomplishing this, amplifier 444 provides current to voltage conversion proportional to the current drawn by the DAC 508, which is a function of the weighted information output from the PROM 510. The voltage output from amplifier 444 enables the modulator switch 448, which passes the carrier in proportion to voltage. The output of the modulator switch 448 is amplified to the desired level by the RF amplifier 157. The modulation envelope correction is accomplished by sampling the output waveform in line 155 through line 452 and summing a correction signal of proper polarity into the DAC at the negative input of the amplifier 444. This provides the shape of the envelope 424 and 428 of FIG. 10 and 560 of FIG. 14. If a stretch enable command is detected in the TP circuit by the clock rate circuitry 500, the clock rate into the address counter will change from $f$ to $f/8$ as information weighted 00, which is the center of the pulse, appears at the PROM 510 output, lines 526 and 530. The slowing of the clock rate has the effect of stretching a designated portion of the analog pulse, providing the longer pulse of pulse 562 in FIG. 14. This condition will prevail until data other than all zeros at the PROM 510 output is detected, at which time the clock rate reverts to $f$. The address counter 512 continues to increment through the PROM 510 addresses until reaching the FF output and is reset. FF or all ones output appears at the PROM 510 at counter address location 00. This condition is detected by the FF detector 504 and disables the DC bias enable 506 to the transmitter amplifier bias circuitry. The DC bias circuitry is enabled for any PROM 510 output other than FF. When a 00 output of the PROM 510 is received by the detector 502, then it feeds a signal through line 524 which when there is an input signal on line $T_p$, changes the clock rate circuitry to $f/8$.

Figure 14:
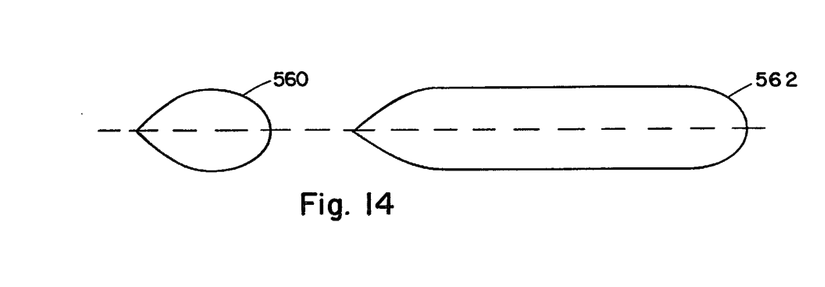
FIG. 14 illustrates the normally transmitted amplitude modulated pulse shape of the carrier frequency pulse transmitted and received to make range measurements and the elongated envelope pulse shape of the timing signal used between the slave responder and interrogator.

So the modulators 158 and 159 in the responder and interrogator circuits control the transmitted signal envelope. This waveform illustrated in FIGS. 10 and 14, is generated from digital values stored in the PROM. The envelope amplitude samples at 0.25 ms intervals are digitized to 8 bit words and stored. The waveform is generated by simply clocking out the values at a 4 KHz rate, and then converting them to analog in a D/A converter. The filtered result is used to low level amplitude modulate the carrier in the RF amplifier.

Thus the RF amplifier 157 in the interrogator circuit, see FIG. 6, provides the output amplitude pulse on the RF carrier through line 155 that is filtered by band pass filter 151 and is then fed to the directional coupler 141 and through switch contact 135, line 145, antenna coupler 131 and antenna 129, which is transmitted to the responder circuit, see FIG. 5.

The antenna 128 of the responder, see FIG. 5, receives the range frequency signal and feeds it through antenna coupler 130, line 144 and through switch contact 134 and through line 142, closed switch contact 138 to the receiver 224.

In the heterodyne receiver, the signal is mixed with the 1st, 2nd and 3rd L. O. signals received from the respective input lines 204, 200 and 202. This provides a detected output signal of 1 KHz to line 232. The 1 KHz narrow band filter 234 uses, for example, five stages of active filtering to give a 5 pole, 2 zero configuration. Digitally controlled analog signal transmission gates are used within the feedback loops of the active filter stages to control filter dumping. In the dumped condition when receiving a signal from the dump line, the Q of the synthesized poles is severely reduced, thereby speeding signal energy dissipation. After narrow band filtering in filters 234, the signal is then split between lines 558 that feeds the signal to the phase meter 256 and through line 460 to the envelope detector 462. The envelope detector 462 and threshhold detectors 248 function to detect the signal amplitude. When the signal amplitude is greater than 0.5 volt, for example, the LO logic signal through line LO goes high, and when the signal is greater than 1 volt, the HI logic signal output of line HI goes high.

The threshhold detectors 248 may, for example, comprise an operational amplifier having a fixed DC standard connected to the negative side of the amplifier and the input signal into the positive side of the amplifier. When the peak input is above the standard DC, then the output of the amplifier goes maximum positive and when the input signal is below the standard DC voltage value, then the amplifier provides a maximum negative. The outputs of the threshhold detectors are used by the controller to identify presence, position and amplitude of incoming signals.

The phase meter is a digital phase meter and has three parts, a zero axis crossing detector, a pulse splitter and a phase accumulating up/down BCD counter. The zero axis crossing detector squares up the incoming sinusoid wave and generally yields a pulse wave, whose duty cycle varies with the signal amplitude. The line of symmetry between rising and falling edges is, however, relatively unaffected by signal amplitude variation, and this point is located by the pulse splitter. This is generally illustrated in FIG. 5. The accumulating counter measures and averages the time difference between the leading edge of a reference 1 KHz square wave as received through line 222 from the divider 212, and the output pulse from the pulse splitter. The accumulating counter totals the result of, for example, 10 consecutive phase measurements and only the upper 3 BCD digits are used as the average phase. Three input lines control the phase meter 238 operation. The first clear input sets the accumulator contents to zero. The second U/D input controls the counting direction to change a lagging phase from a positive to negative phase sense, and the start line starts a phase measurement cycle. The output in lines 246 in twelve logic lines of 3 BCD digits.

The output of the envelope detector 462 is fed through line 254 and through line 258 to the sample and hold circuit 260. The sample and hold circuit is used for pulse amplitude sensing during the antenna tuning procedure. The DC level it developes in response to a S/H pulse is proportional to the signal peak amplitudes and is communicated to the tuning indicator in the form of a DC signal in the antenna coupler over the RF antenna coax.

The first local oscillator 252 provides an output frequency signal that is synthesized by digital methods and may be set up for any frequency from 1234 KHz to 1355 KHz in steps of 20 Hz. Once set up, the frequency can be immediately incremented to 80 Hz using the M/S (master/slave) control input to operate on the slave responder frequency to provide access to the slave responder in a two frequency system.

It will be noted that the responder unit of FIG. 5 differs from the interrogator unit of FIG. 6 by the addition of a 1 KHz phase shifter 178 and a 5 KHz mixer-filter 174 to generate a controllable phase carrier. This circuit arrangement generates a carrier output signal from the responder that is phase coherent to the received signal at the output of the directional coupler 140, and since the receiver 224 and narrow band filter 234 process both receive and transmit signals, their phase shift is cancelled. The purpose of phase shifter 178 and mixer-filter 174 is to shift the transmitted phase by the necessary amount. The phase shifter 178 is a known digital circuit that is complementary in function to the phase meter 238. Basically, it is a counting circuit using a three-stage BCD counter with a 1 MHz input. It has a resolution of 1,000 parts, cycles at a 1 KHz rate, and is synchronized to begin its count at the leading edge of an input 1 KHz reference. The output is a 1 KHz wave whose leading edge is generated by the coincidence of counter contents with a three-digit BCD static input on input lines S1-S12. The output trailing edge is generated when the counter contents equals the static input plus 500. The resulting output is a 1 KHz square wave that lags the input reference wave by the three-digit BCD input on lines S1-S12. For example, if the BCD input is 245, the phase lag will be 0.245 cycles.

The object of this circuit is to remove the internal phase lag in the responder circuit, and synchronize the output transmitted signal from the responder to the phase of the same carrier frequency signal of the input signal received from the interrogator. Referring to FIG. 10, with an input modulated waveform 424, there is contained therein the carrier frequency 426. This interrogator signal is received by the responder. The responder then generates a transmitted output wave 428 through the modulator 158 and RF amplifier 156 that has the same carrier frequency 430 and which within the envelope has the same phase orientation relative to the carrier frequency 436 of the mixer-filter 172 as the received carrier 426. So, when the signal is received by the interrogator, the interrogator measures the phase of the returned signal from the transponder, in which the returned signal has only the phase delay resulting from the time of transmitting from the interrogator to the responder and from the responder to the interrogator. This is all accomplished through the use of a single carrier frequency.

FIG. 7 is a block diagram of the controller. The ROM 280, ROM interface 284, CPU 304, and RAM 213 comprise commercially available micro processor components. This assembly executes an instruction sequence stored in the ROM 280 and the available instruction set provides for control of the signals appearing at the output ports 324 and permits reading signals into the micro processor from the input ports 302. The instruction sequence controls the RF units to receive, transmit, and process signals to obtain the desired range data in the manner set forth. The instruction set includes a conditional branch instruction whose action depends upon the signal appearing at the test input of the CPU 304. This is wired to a 1 KHz reference signal and provides a basis for timing the execution of instruction sequences.

As a specific description there are, for example, 40 instructions that are 8 bits long and 5 two word instructions that are 16 bits long. Most 8 bit instructions execute in 11.2 ms and all 16 bit instructions execute in twice this amount. Instructions are stored in the ROM 280 with 8 bits per word and up to 2048 words. Data is handled with a spoke type data flow around the CPU unit 304. Thus the hub is a 4 bit accummulator that can transfer data to or from any of the 16 registers or any RAM 312 cell, to any of the 8 ROM associated output ports 324, to any of 4 RAM associated output ports 324, or can read data from any of 8 input ports 302. All ports, RAM cells, and registers are 4 bits wide. The RAM 312 has a total of 320 cells that are arranged into 16 lines of 16 general cells and 4 status cells.

The display and output functions illustrated in FIG. 7 are present only on the interrogator, see FIG. 6. There are, for example, 14 display locations, see FIG. 9, that can display any digit from zero to nine or can be blank. Data is written into the display by supplying a 4 bit BCD digit value in lines 318 and a 4 bit display location code in lines 320 and then pulsing the jam line 322 into the display memory 328. If the same data is to be written into the data output jack, a jam pulse is subsequently sent through line 348 to the data output interface 342. By repeating this for each digit, the display and output can be loaded with data. When a flag signal is sent from output ports 324 to the data output interface 342, one of the output lines is set to indicate whether the output is range 1 or range 2 data and another line is pulsed to indicate to the external device that the data may be read. The output range data has a three digit fractional part that is converted to analog form in the chart recorder interface 340 and stored in a sample and hold circuit for driving an external strip chart recorder. This gives a record of lane crossing that is useful in determining lanes in the event of signal loss or in any of a number of other happenings.

Operator control of the unit is provided by settings on switches on the front panel 334. These switches involved with program control are read by the micro processor through the input ports 302. Most of these switches are multi-position type with 4 bit coding of their position. To read a switch, the switch address is written into the proper RAM 312 associated output port 314. This address is decoded in panel switch select logic 334 and a data selector routes the selected switch line to an input port where the position code can be read.

In operation, when the power is turned on the CPU 304 executes a brief initialization routine. All main routines are keyed to a two second timing frame and in the interrogator 304, there are routines for timing acquisition, interrogating, antenna tuning, standing by and entering the control and range data. In the responder there are routines for master responding, slave-timing acquisition, slave responding, antenna tuning, standing by and manually setting internal timing.

As previously stated the operator selection of a routine is by means of the front panel mode switch and entry button. The mode switch is positioned to indicate the desired routine and the entry button is depressed thereby setting an indicator flip-flop. Every two seconds, in the first millisecond of the timing frame, the state of the indicator flip-flop, is examined to see if there has been an operator input. If it has been set, the micro processor clears it, reads the mode switch, and begins execution of the new routine. Routines such as the timing acquisition routine upon completion, passes automatically to the interrogating or responding routine.

The timing reference used by the controller is the 1 KHz square wave fed through the line 220 to the CPU 304. The falling edge of this signal defines the start of a 1 ms period. In the master responder, at 5 ms into the 2 second timing frame, the T/R and TP lines of the output ports 324 are set high, a gain value is loaded into lines G1–G8 of the gain control D to A converter 226 from the RAM 312. The dump line is set low and the master slave (M/S) line to the synthesizer 252 is set high for the master frequency. After an interval of 15 ms, the TX line is pulsed high to initiate a transmission in the interrogator. Since the TP line is already high, a timing pulse is generated in the modulator 159. After an interval of 47 ms (67 ms into the frame), the HI logic signal from the threshhold detector 249 is checked. If this line is high it indicates the gain of the respective receiver 225 or 224 is too great and the gain value in the RAM 312 used on line G1–G8 is decreased. If the line is low, the gain value is incremented upwardly. After an interval of 63 ms (130 ms into the frame), the dump line is set high, and a final waiting of 14 ms completes the 144 ms timing pulse segment of the frame. What follows is a repetition of the 166 ms responding routine which completes the frame.

Each interrogator of a multiple system is assigned two different time slots in which to interrogate master and slave responders respectively. The time slots are numbered from 0 to 15 and the assigned time slots are stored in the RAM 312. These values are established either from default values transferred from ROM 280 to RAM 312 during initialization at power turn-on or from manual operator inputs.

At 5 ms into the assigned time slot, the interrogator initiates an interrogation pulse signal. The phase meter 239 is cleared and the receiver 225 gain is set through the gain control 227 for the interrogators own signal as sampled by the direction coupler 141 through lines 149, switch contact 137 and switch contact 139. The narrow band filter 235 is undumped in preparation to monitor the outgoing signal. At 45 ms into the time slot, the phase meter 239 is started in a negative sense. At 52 ms the HI threshhold detector 249 signal is tested and stored gain value is updated. The phase measurement in the interrogator is completed at 55 ms, the T/R switch is changed to the receive position, the narrow band filter 235 is dumped, and the receiver 225 gain is set by gain control 227 for the responder signal. The narrow band filter 235 is undumped at 63 ms, and the phase meter 239 is started in the positive sense at 103 ms. Receiver 225 gain is checked at 110 ms, and the phase measurement of the responder signal is complete at 113 ms.

The phase measurement accumulated in the phase meter 239 is the difference between the receive phase and the transmitted phase as sensed at the receiver 225 inut. Carrier phase shifts originating in the synthesizer 253, RF amplifier 157, bandpass filter 151, and 1 KHz narrow band filter 235 are thus cancelled, and the receiver phase shift is cancelled within a small phase versus gain receiver characteristic.

At the responder, see FIG. 5, similar processing occurs during the time slot. A separate receiver gain value is stored in RAM 312 for each time slot and at the beginning of the time slot the receiver 224 gain is set through lines G1–G8 to the gain control 226 to the appropriate value. At 5 ms into the time slot, the phase meter 238 is cleared and the narrow band filter 234 is undumped. In the next 40 ms, the signals strength is checked several times to detect excessive receiver 224 gain. This is accomplished through the envelope detector 426 and threshhold detectors 248 and HI and LO outputs. At 45 ms, the phase meter 238 is started in the positive sense, and during the phase measurement while the signal should be at its peak, a series of signals strength tests are made to determine if a genuine interrogation is present requiring a reply. If the proper signal is detected, the T/R switch is set to transmit at 55 ms, the narrow band filter 234 is dumped at 58 ms, and the receiver 224 gain is set to the "self" signal processing value. Before a transmission can begin, the phase shifter 178 is set to a value that will insure proper phase transmission. This value is established by adding a phase offset value stored in RAM 312 to the current phase meter 238 reading. Initially, the phase offset value is arbitrarily set and probably incorrect, but it is corrected in small steps after each response to an interrogation signal.

The responder begins its transmission and undumps its narrow band filter 234 at 63 ms into the time slot. At 103 ms, the phase meter 238 is started in the negative sense, receiver gain 224 is checked at 110 ms, and the phase measurement is complete at 113 ms. If the correct phase has been transmitted by the responder, the final value in the phase meter 238 should be the difference of two equal quantities, which is zero. If a non-zero value is left in the phase meter 238, the phase offset value stored in RAM 312 is updated. As with the interrogator, phase comparison of received and transmitted signals is made at the receiver input. In the responder, the desired comparison is equality and this condition is forced by modification of the internal phase offset value. In the interrogator, the phase comparison gives the measurement of range.

Since interrogation and reply occur sequentially with a time delay of, in this embodiment 58 ms, there could be a small change of interrogator position during the measurement. The resulting range is an average value over the interval and is approximately equal to the range at 79 ms into the time slot. If the boat is moving with constant speed and direction, then normally consecutive range measurements will differ by a relatively constant amount. A running average of this difference is maintained within the interrogator and is used to predict the value of the next reading. The running average of differences is called the predictor and is subject to change owing to changes of direction or speed of the boat. Where there is an erroneous reading or where the boat is changing speed or direction, the predictor will not be correct in predicting the correct reading. Where the predictor value is not that which will provide the correct prediction, it must be increased or decreased to correct its value. However normally the change is only 0.1 of the difference of the increased or decreased or difference angle, so that the change in the predictor is not overally responsive to an incorrect reading. The determination of the predictor and the rate of change is made by the CPU 304 in response to the output 246 of the phase meter in lines P1–P12 to the input ports 302.

Thus each new measurement is used to update a running average of range differences and also a running average of range. The first step is to add an operator supply calibration constant stored in the RAM 312 to the new phase meter reading. Only the fractional part of the sum is retained and with the proper calibration constant, it indicates the fractional part of range between antennaes. This phase sum, denoted by $\theta$, is next compared to a predicted value and the difference is truncated if necessary. In addition to a running average of range, $\phi$, a running average of range differences, $\psi$, is also maintained. Forming the sum of these, and dropping the integer part gives a prediction of the next value of $\theta$. The difference of the actual and predicted value of $\theta$, denoted by $\Delta$, is truncated as necessary. The reason for this is that a widely differing measurement is probably erroneous, but can't be entirely ignored. The new value of $\phi$ is formed by adding $\psi$ and $\Delta/5$ to the old value. The new value of $\psi$ is then formed by adding $\Delta/10$ to the old value. This is:

$$\phi n = \phi n - 1 + \psi n - 1 + (\Delta 5)$$
$$\psi n = \psi n - 1 + (\Delta/10)$$

The range measurements are internally expressed in "lines". A lane is a distance equal to half the carrier wavelength. The phase meter measures in decimal fractions of a cycle, and a radial movement of one lane increases the round trip distance to the responder by one wavelength, or one cycle. The lane width may be computed from the known carrier frequency and the velocity of the propagation of the wave, in the known manner.

The longer length of the signal envelope 562, see FIG. 14, from the master responder is detected by the controller of the particular interrogator unit, such as interrogator No. 1, to provide an input detected by the RAM 312, to provide timing synchronization of the modulator signals 158 through the TX output of the output ports 324.

Having described my invention, I now claim:

1. A system for measuring the range distance between an interrogator at a first point and a responder at a second point comprising:
    means at the interrogator for generating and transmitting to the responder pulses of amplitude modulated RF carrier,
    receiver means at the responder for receiving the interrogator transmitted pulses of amplitude modulated RF carrier and detecting the phase of the RF carrier in the pulses,
    means at the responder for generating and transmitting to the interrogator pulses of amplitude modulated RF carrier,
    said responder generated RF carrier having the same frequency as the interrogator generated RF carrier,
    said responder generating means having phase shift means for making the phase of the transmitted responder generated RF carrier phase coherent with the phase of the transmitted interrogator generated RF carrier received by the responder receiver means,
    and receiver means at the interrogator for receiving the responder transmitted pulses of RF carrier and determining the phase shift between the interrogator generated and transmitted RF carrier in the responder transmitted pulses and the RF carrier in the pulses to determine the range distance between the interrogator and responder.

2. The system as defined in claim 1, wherein the responder generating means includes,
    synthesizer means including an oscillator for generating the responder carrier,
    said synthesizer means including phase changing means responsive to input signals for changing the phase of the responder carrier,
    and responder phase detector means for comparing the phase of the responder carrier with the phase of the interrogator carrier received by the responder and providing input signals to said phase changing means proportional to a difference between the phases.

3. The system as defined in claim 2 including,
    program means for inserting a predetermined phase shift signal into said phase changing means for changing the phase of the responder carrier,
    said phase detector means having means for detecting the phase shift between the interrogator carrier received by the responder and the responder carrier with the phase shift of the phase control means and the predetermined phase shift signal and providing a correction signal,
    and means responsive to the phase detector means for changing the predetermined phase shift signal of said program means in response to said correction signal.

4. The system as defined in claim 3 wherein,
    said synthesizer means including a voltage controlled oscillator,
    and said phase changing means comprising a voltage source means for providing a voltage at the VCO oscillator in proportion to the input signals.

5. The system as defined in claim 2 including,
    digital means for detecting the input signals of the responder phase detector means,
    and said digital means including means for inserting a predetermined phase controlling voltage into the phase changing means.

6. The system as defined in claim 1 wherein,
    said responder means having means for detecting the pulse of interrogator RF carrier and the phase of the carrier within the pulse envelope,
    and said interrogator receiver means having means for detecting the pulse of responder carrier and determining the phase of the carrier in the pulse envelope.

7. The system as defined in claim 6 wherein,
    the interrogator receiver means having phase determining means for determining the phase shift between the responder carrier in the pulse and the interrogator carrier in the pulse,
    and means for displaying the relative phase differences in range distance.

8. A system as defined in claim 7 wherein,
    said interrogator generating means including synthesizer means for generating the carrier,
    modulator means for modulating the carrier to a given shaped amplitude modulated signal pulse,
    transmitter means for transmitting the modulated carrier,
    directional coupler means for feeding the transmitter means output carrier to the antenna and providing a bleed off portion of the interrogator carrier to the interrogator receiver means,
    and attenuator means for attenuating the magnitude of the bleed off portion to a magnitude substantially equal to the received responder carrier.

9. A system as defined in claim 8 wherein,
    said responder generating means including synthesizer means for generating the carrier,
    modulator means for modulating the carrier to a given shaped amplitude modulated signal pulse,
    transmitter means for transmitting the modulated carrier,
    directional coupler means for feeding the transmitter means output carrier to the antenna and providing a bleed off portion of the interrogator carrier to the responder receiver means,
    and attenuator means for attenuating the magnitude of the bleed off portion to a magnitude substantially equal to the received interrogator carrier.

10. The system as defined in claim 9 in which, said responder carrier generating means having a phase detector means for detecting the phase difference between the responder carrier and the interrogator carrier received by the responder and providing an output pulse proportional to the phase difference, phase control means for providing a phase control signal proportional to the output pulse of said phase detector means, and said synthesizer means having means responsive to the output of the phase control means to change the phase of the responder carrier in response to the phase control signal that makes the responder carrier phase coherent with the interrogator carrier received by the responder.

11. The system as defined in claim 10 wherein, said responder receiver means having threshhold detector means for detecting the amplitude above threshhold of the amplitude pulse of the interrogator carrier and providing an output signal, switching means in said responder for switching between the transmitter and receiver of said responder, and timing means responsive to the output signal of the threshhold detector for operating said switch means.

12. The system as defined in claim 8 wherein, said synthesizer including a VCO oscillator, and said phase control means providing a voltage output to said synthesizer means VCO proportional to the output of said phase detector.

13. A system for measuring the range distance between an interrogator at a first point and at least two responders at spaced fixed points comprising:

an interrogator having means for generating and transmitting to the responders pulses of amplitude modulated RF carrier, means at each of the responders for receiving the interrogator transmitted pulses of amplitude modulated RF carrier and detecting the phase of the RF carrier in the pulses, means at each of the responders for generating and transmitting to the interrogator pulses of amplitude modulated RF carrier that have the same frequency as the interrogator RF carrier, each of said responders having means for making a phase comparison of each of the responder RF carrier as transmitted by each of the responders to the phase of the interrogator RF carrier received by each of the respective responders, means at the interrogator for detecting the responder signal received from each of the responders and determining the phase shift between each of the responder received RF carrier pulses and the RF carrier generated by the interrogator to determine the range distance between the interrogator and each of the responders, controller means for multiplexing the interrogator for receiving the carrier from each of the responders on a time shared basis, and means for displaying the relative range between the interrogator and the respective responders.

14. The system as defined in claim 13 including, means at the interrogator for initially setting the position of the interrogator in lane and phase orientation relative to each of the responders, and the phase detecting means of said interrogator including phase meter means for detecting any change in the range lane distances between the interrogator and the responders.

15. The system as defined in claim 14 including, synthesizer means in each of the responders for generating the responder RF carrier, modulator means at each of the interrogators and responders for modulating the respective carriers with a pulse having a predetermined shape envelope, and each of said interrogators and responders having digital means for setting the particular shape of said envelope pulse shape form.

16. The system as defined in claim 15 wherein, the phase detector and comparison means of the interrogator and responders each having means for determining the phase of the carrier in the respective pulse envelopes.

* * * * *